Sept. 8, 1970          W. A. BYRD          3,527,035

ROLLING SHOE

Filed Dec. 21, 1967

INVENTOR:
WYLIE A. BYRD
BY:

United States Patent Office 3,527,035
Patented Sept. 8, 1970

3,527,035
ROLLING SHOE
Wylie A. Byrd, Rte. 2, Box 25, Tulia, Tex. 79088
Filed Dec. 21, 1967, Ser. No. 692,371
Int. Cl. A01d 45/02
U.S. Cl. 56—119                                    16 Claims

ABSTRACT OF THE DISCLOSURE

A rolling conic shoe is journaled for rotation coaxially with each lifting cone of a grain harvester to prevent the apex of the lifting cone from digging into the soil.

BACKGROUND OF THE INVENTION

Field of the invention

This invention relates to agricultural harvesting and more particularly to a machine for harvesting grains and similar crops.

Description of the prior art

My prior patents, No. 3,107,474 and No. 3,173,236, show lifting cones with spiral elements wound around them for lifting the stalks of grain crops which have been bent or broken or have fallen down.

The No. 3,107,474 patent shows a shoe 96 attached to near the apex of the lifting cone. The shoe does not rotate and is for the purpose of preventing the point of the cone from digging into the ground.

The No. 3,173,236 patent shows a flexible finger 34 which is attached to the apex of the cone 30. The purpose of the finger is to prevent the apex of the cone from digging into the ground.

SUMMARY OF THE INVENTION

I have invented a rolling conic shoe to be journaled for rotation to the lifting cone near the apex to prevent the apex of the lifting cone from digging into the ground. The lifting cones angle downward to the ground and therefore it is necessary for the angle of the rolling-shoe cone to be over twice as great as the angle that the cone is tilted. Therefore, the base of the rolling cones will touch the soil before the apex.

The shoe is journaled to a spike extending from the apex of the lifting cone.

An object of this invention is to harvest agricultural crops.

Another object of this invention is to harvest grain which is not standing upright.

A further object is to prevent lifting cones upon a grain harvester from digging into the soil.

Further objects are to achieve the above with a device that is sturdy, lightweight, compact, durable, simple, save, versatile, reliable and efficient, yet inexpensive and easy to manufacture, install, operate, and maintain.

The specific nature of the invention, as well as other objects, uses, and advantages thereof, will clearly appear from the following description and from the accompanying drawing, the different views of which are not necessarily to the same scale.

DESCRIPTION OF THE PREFERRED EMBODIMENT

Figure 1:
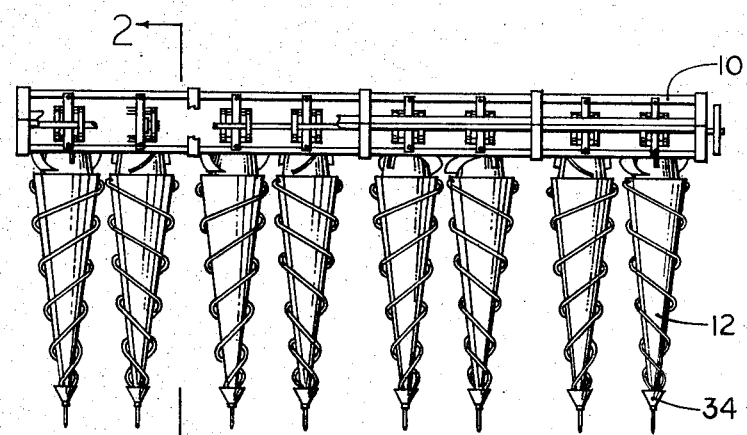
FIG. 1 shows a top plan view of an embodiment of this invention, with the entire harvesting machine omitted inasmuch as it forms no part of this invention.

Frame 10 is adapted to be attached to a harvesting mechanism. This is more fully described in my prior patents, noted above, and will not be further described here, nor will detailed description be given of the attachment of the lifting cones 12 to the frame 10 through pendant 14. The lifting cone 12 is part of a lifting cone assembly 16 which includes many elements, but more specifically to this invention, includes the lifting cone structure 12 which has the cone constructed of sheetmetal with the spiral elements 18 wound around it.

According to this invention, metal spike or finger 20 is attached to the cone 12 at its apex and extends forward thereof. The spike is attached within tube 22 which is coaxial with the cone and forms part of the cone structure. The spike 20 is attached to the tube 22 by any convenient means, e.g., diametric pin 24. Also, collar 26 is attached to the spike 20 by any convenient means, e.g., diametric pin 28. The end of the tube 22 and the collar 26 form a retainer for bearing 30. Bushing 32 is journaled around the bearing 30. Conic shoe 34 is attached as by welding to the bushing 32.

Figure 2:
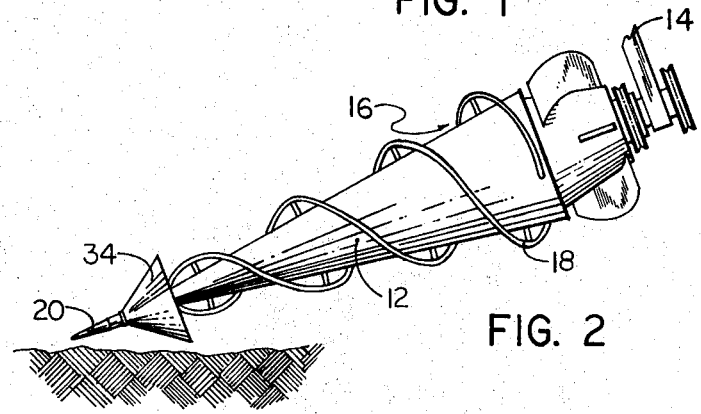
FIG. 2 is a side elevational view of one lifting cone assembly with the shoe thereon.
Figure 3:
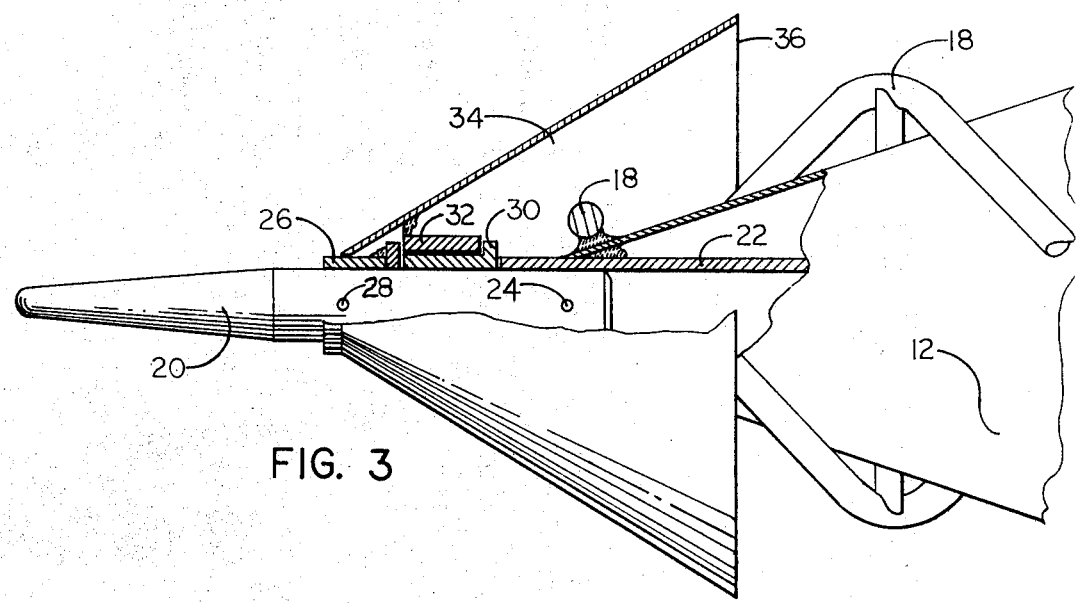
FIG. 3 is a detailed view of the shoe upon the end of pendant 14. The lifting cone 12 is part of a lifting cone construction.

Thus it may be seen that the conic shoe 34 is journaled for rotation upon the structure of the lift cone 12. The conic shoe 34 is coaxial with the lift cone 12 and is journaled for rotation at about the apex of the lift cone. Close inspection of FIG. 3 will indicate that the apex of the shoe cone is slightly forward of the apex of the lift cone, and the base of the shoe cone overlaps and surrounds the apex of the lifting cone 12. Also, inspection of FIG. 2 will show that the lift cone operates with its axis at an angle to the horizontal. The apex angle of the shoe cone 34 is over twice the lift angle the axis of the lift cone makes to the horizontal surface of the soil and therefore, when the shoe cone 34 contacts the ground the base 36 of the cone will contact the soil before its forward part. Also, it will be noted that the apex angle of shoe cone 34 is greater than apex angle of the lifting cone 12. I have found that an apex angle for the shoe cone 34 of approximately one and one-half times the apex angle of the lifting cone 12 operates well.

The sheetmetal forming the cone 34 is cut off before the apex. However, if the sides of the cone were continued, they would meet at a point where the apex would be, the cone would touch at the base first. The shoe cone 34 will cause the lift cone assembly 16 to ride along the surface of the ground. The spike 20 runs forward of the cone 34 slightly. As may be seen in FIG. 2 the point of the spike 20 would contact the surface of the earth about simultaneously with the base 36 of the shoe cone 34.

Therefore, it may be seen that I have provided a shoe in the form of a cone which prevents the apex of the lifting cone from digging into the earth, and, therefore, makes more efficient the harvesting of grain.

I claim as my invention:

1. In a mechanism for lifting growing agricultural crops for harvest having
   (a) a frame, and
   (b) at least one lifting cone structure mounted for rotation of said frame,
   (c) the apex of the lifting cone extending forward and downward;
   (d) an improved shoe for preventing the apex of the lifting cone from digging into the soil comprising in combination:
   (e) a shoe cone,
      (i) the shoe cone coaxial with the lifting cone,
      (ii) the apex angle of the shoe cone greater than the apex angle of the lifting cone, and
      (iii) the base of the shoe cone overlapping and surrounding the apex of the lifting cone, (f) the shoe cone mounted for rotation on the lifting cone structure near the apex of the lifting cone.

2. The invention as defined in claim 1 with the additional limitation of
   (g) the axis of said lifting cone angling downward from horizontal at a lift angle
   (h) the apex angle of the shoe cone over twice the lift angle,
   (j) so that the shoe cone base contacts the soil before the shoe cone apex.

3. The invention as defined in claim 1 with the additional limitation of
   (g) the apex of the shoe cone is forward of the apex of the lifting cone.

4. The invention as defined in claim 3 with the additional limitation of
   (h) the axis of said lifting cone angling downward from horizontal at a lift angle
   (j) the apex angle of the shoe cone over twice the lift angle,
   (k) so that the shoe cone base contacts the soil before the shoe cone apex.

5. The invention as defined in claim 1 with the additional limitation of
   (g) a spike extending coaxially from the lifting cone apex,
   (h) said shoe cone journaled to said spike.

6. The invention as defined in claim 5 with the additional limitation of
   (j) the apex at the shoe cone is forward of the apex of the lifting cone.

7. The invention as defined in claim 5 with the additional limitation of
   (j) the axis of said lifting cone angling downward from horizontal at a lift angle
   (k) the apex angle of the shoe cone over twice the lift angle,
   (m) so that the shoe cone base contacts the soil before the shoe cone apex.

8. The invention as defined in claim 1 with the additional limitation of
   (g) said lifting cone structure including spiral lifting elements wound around a smooth cone.

9. The invention as defined in claim 8 with the additional limitation of
   (h) the apex at the shoe cone is forward of the apex of the lifting cone.

10. The invention as defined in claim 8 with the additional limitation of
    (h) a spike extending coaxially from the lifting cone apex,
    (j) said shoe cone journaled to said spike.

11. The invention as defined in claim 8 with the additional limitation of
    (h) the axis of said lifting cone angling downward from horizontal at a lift angle
    (j) the apex angle of the shoe cone over twice the lift angle,
    (k) so that the shoe cone base contacts the soil before the shoe cone apex.

12. The invention as defined in claim 11 with the additional limitation of
    (m) the apex at the shoe cone is forward of the apex of the lifting cone.

13. The invention as defined in claim 12 with the additional limitation of
    (n) a spike extending coaxially from the lifting cone apex,
    (o) said shoe cone journaled to said spike.

14. The invention as defined in claim 4 with the additional limitation of
    (m) a spike extending coaxially from the lifting cone apex,
    (n) said shoe cone journaled to said spike.

15. The invention as defined in claim 6 with the additional limitation of
    (k) said lifting cone structure including spiral lifting elements wound around a smooth cone.

16. The invention as defined in claim 7 with the additional limitation of
    (n) said lifting cone structure including spiral lifting elements wound around a smooth cone.

References Cited

UNITED STATES PATENTS

| | | | |
|---|---|---|---|
| 1,565,189 | 12/1925 | Morgan | 56—119 XR |
| 3,107,474 | 10/1963 | Byrd | 56—119 |

FOREIGN PATENTS

| | | |
|---|---|---|
| 139,903 | 1/1951 | Australia. |
| 897,777 | 6/1944 | France. |

F. BARRY SHAY, Primary Examiner

J. A. OLIFF, Assistant Examiner